United States Patent [19]

Ikkai et al.

[11] Patent Number: 5,757,161
[45] Date of Patent: May 26, 1998

[54] APPARATUS AND METHOD FOR LIMITING THE SPEED OF AN ELECTRIC MOTOR

[75] Inventors: Yasufumi Ikkai, Kobe; Satoshi Tamaki, Hirakata, both of Japan

[73] Assignee: Matsushita Electric Industrial Co., Ltd., Osaka, Japan

[21] Appl. No.: 845,202

[22] Filed: Apr. 21, 1997

Related U.S. Application Data

[63] Continuation of Ser. No. 564,576, Nov. 29, 1995, abandoned.

[30] Foreign Application Priority Data

Dec. 1, 1994 [JP] Japan ................. 6-298385

[51] Int. Cl.$^6$ ...................................... H02P 1/46
[52] U.S. Cl. ............. 318/719; 318/721; 318/369; 388/803; 180/171
[58] Field of Search .................. 318/711, 715, 318/721, 722, 757–759, 798–817, 369, 375, 376; 388/801, 803, 826–828, 830; 180/170–174, 178, 179

[56] References Cited

U.S. PATENT DOCUMENTS

| | | | |
|---|---|---|---|
| 3,701,935 | 10/1972 | Collie | 388/801 |
| 3,845,368 | 10/1974 | Elco | 318/139 |
| 4,012,680 | 3/1977 | Dickerson et al. | 318/79 |
| 4,227,128 | 10/1980 | Cockroft et al. | 318/462 X |
| 4,260,937 | 4/1981 | Cavie et al. | 318/465 X |
| 4,367,435 | 1/1983 | Bailey et al. | 318/258 X |
| 4,523,564 | 6/1985 | Sturdy | 318/628 X |
| 4,675,585 | 6/1987 | Krueger et al. | 388/801 |
| 5,196,774 | 3/1993 | Baciak et al. | 318/569 |
| 5,384,522 | 1/1995 | Toriyama et al. | 318/371 |
| 5,504,404 | 4/1996 | Tamaki et al. | 318/432 |
| 5,592,355 | 1/1997 | Ikkai et al. | |

FOREIGN PATENT DOCUMENTS 503879  9/1992  European Pat. Off. .

OTHER PUBLICATIONS

"Flux–Weakening Regime Operation of an Interior Permanent–Magnet Synchronous Motor Drive", vol. 4, Jul.–Aug. 1987, IEEE Transactions on Industry Applications, by Thomas M. Jahns.

Primary Examiner—Brian Sircus
Attorney, Agent, or Firm—Greenblum & Bernstein P.L.C.

[57] ABSTRACT

A motor control apparatus for detecting motor overspeed in an electric car to prevent destruction of the motor and assure the safety of the vehicle. Torque control is applied when the motor speed is less than a specified rotational velocity. When the motor is detected to be operating at greater than the specified rotational velocity, i.e., when motor overspeed is detected, the motor is controlled to coast or regenerate to lower the motor speed to less than the specified rotational velocity, after which normal control is resumed, thereby preventing collision due to sudden braking and preventing damage to the motor.

14 Claims, 14 Drawing Sheets

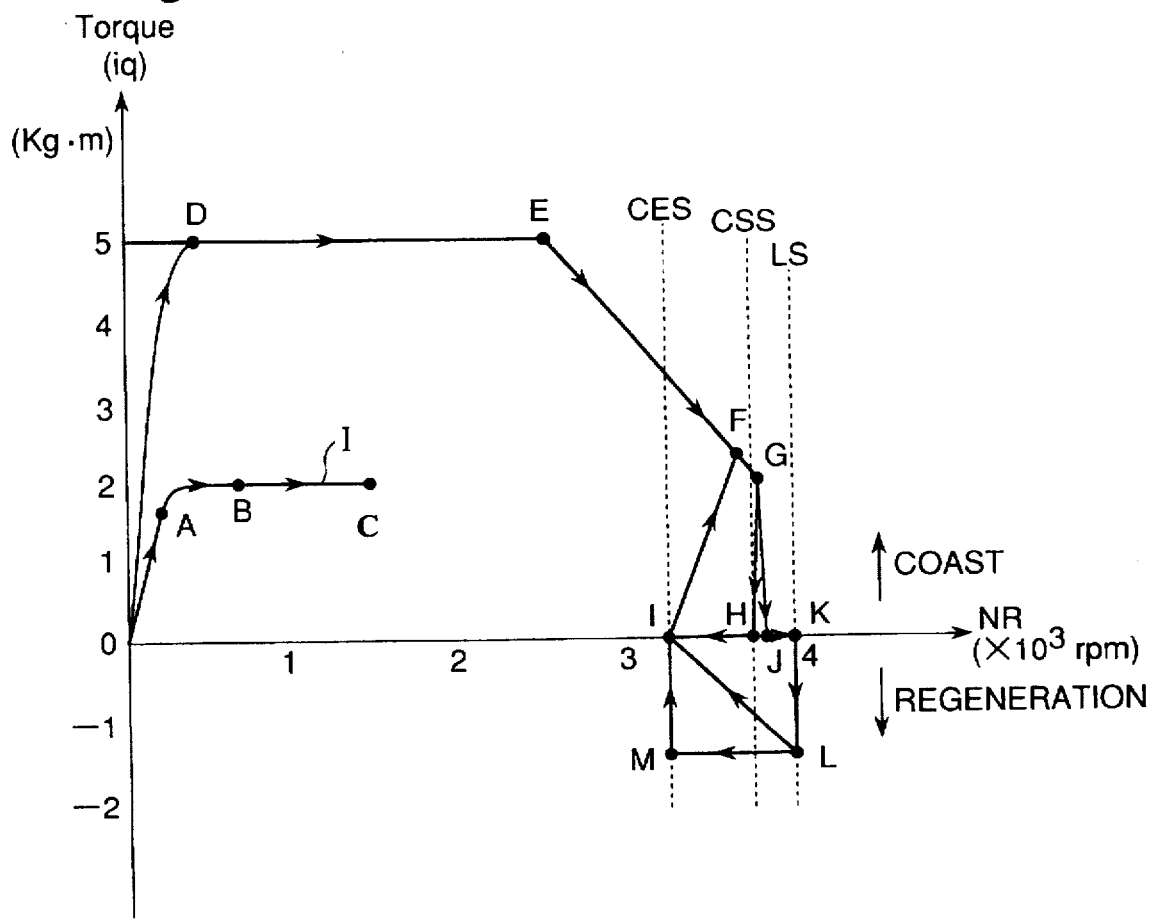

APPARATUS AND METHOD FOR LIMITING THE SPEED OF AN ELECTRIC MOTOR

This application is a continuation of application Ser. No. 08/564,576, filed Nov. 29, 1995, now abandoned.

BACKGROUND OF THE INVENTION

1. Field of the Invention

The present invention relates to a method and apparatus for controlling a motor and, more particularly, to a method and apparatus for protecting the motor used, for example in an electrically-powered motor vehicle from being over-rotated or over-rev'ed.

2. Description of the Prior Art

The development of electrically-powered motor vehicles, particularly electric cars, has been pursued in recent years as one means of addressing environmental problems. While the power source for these vehicles is either an AC or DC motor, high efficiency synchronous motors using a permanent magnet for the rotor are being particularly developed for electric cars.

While synchronous motors of this type are widely used in industrial factory automation applications, they are also suited for use in electric cars, and the basic control method is essentially the same.

While motor speed control is primarily used for motor control in factory automation applications, and the current supply to the motor is determined based on motor speed calculations, torque control is used to control the internal combustion engines driving common motor vehicles. More specifically, fuel injection to the engine is controlled based on the driver's operation of the accelerator pedal, and the engine generates torque in response to the injected fuel supply. It follows that a similar torque control method is also suitable for controlling the motor in an electric car.

Overspeed prevention control methods used to prevent the motor from operating at an unsafe speed in factory automation applications constantly monitor the motor speed and reduce the current supply to the motor when the motor speed approaches a predetermined limit speed. Because torque control is used in electric cars, however, it is necessary to separately control the motor speed. In addition, if the torque is gradually reduced by an automatic control means in an electric car as the motor speed approaches some predetermined limit, as occurs with speed control methods in factory automation applications, the driver feels a diminished sense of control. In extreme cases, sudden deceleration resulting from such motor speed control methods could result in rear-end collisions from vehicles following behind.

Overspeed control during field-weakening control can also result in over-regenerating, which can lead to damage to the battery.

Problems with the power supply, i.e., motor, in a motor vehicle is extremely dangerous, and can create life-threatening situations. Safety measures to prevent such problems are therefore essential. Demand for high reliability is also great.

Furthermore, an overspeed (over-driven/over rev'ed) operation of the motor can not only destroy the motor, but also cause the rotor to lock, resulting in the wheels locking or a vehicle fire.

Therefore, an object of the present invention is to provide an electric car control method whereby the vehicle can safely avoid hazardous situations caused by such motor-related problems, damage to the battery due to over-regeneration can be prevented, and the motor can be controlled without causing the driver to feel a diminished sense of control.

SUMMARY OF THE INVENTION

To achieve the aforementioned object, a motor control method according to the present invention detects the motor speed using an encoder. When the motor is detected to be operating at a speed exceeding a predetermined limit level, the control circuit sets the motor current supply to zero, causing the motor to coast, or a negative value, causing the motor to regenerate, irrespective of the accelerator input command. During field-weakening control, a required d-axis current is supplied to prevent over-regeneration.

When the motor speed drops below the predetermined limit level, control according to the acceleration signal command is resumed to prevent damaging any parts, maintain vehicle safety, and prevent vehicle fires and similar disasters.

BRIEF DESCRIPTION OF THE DRAWINGS

The present invention will become more fully understood from the detailed description given below and the accompanying diagrams, wherein:

FIG. 3A is a graph of the motor characteristics controlled by the first, second and third protection systems;

DESCRIPTION OF PREFERRED EMBODIMENTS

A motor control apparatus according to the first embodiment of the present invention is described below with reference to FIG. 1. It is noted that the motor control apparatus of FIG. 1 can be applied with any one of the first, second and third protection systems.

Figure 1:
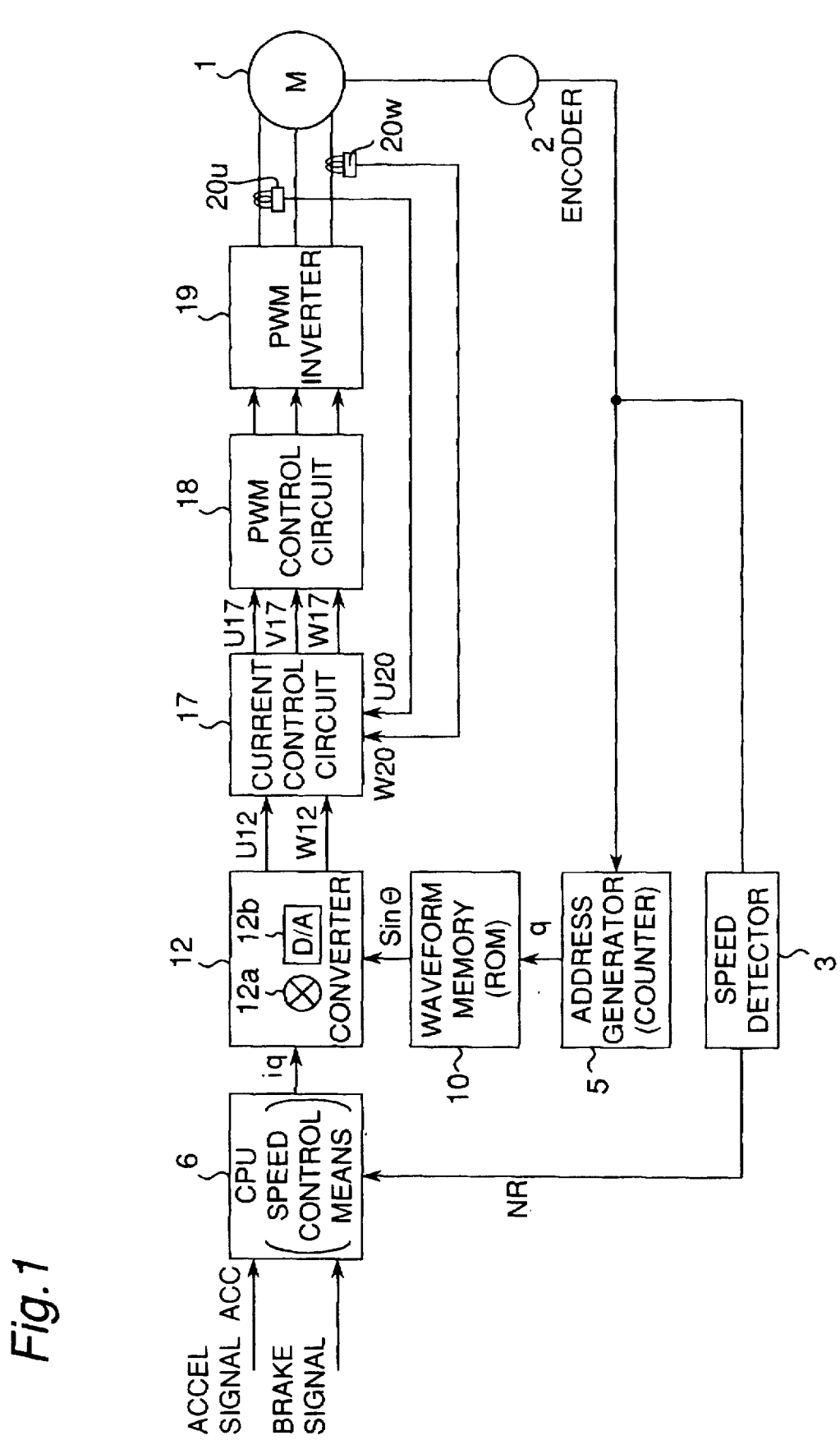
FIG. 1 is a block diagram of a motor control apparatus according to a first preferred embodiment of the present invention.

Referring to FIG. 1, motor 1 is a synchronous motor, and in this embodiment is an AC servo motor driven by a three-phase (U, V, W) current used for the power supply for an electric car. Any other type of motor can be used. An encoder 2 is coupled to the motor 1. The encoder 2 outputs a number of pulses, such as 4000 pulses, per each rotation, and one phase information pulse per each rotation. A motor speed detector 3 receives the phase information pulse to detect a motor speed (number of rotations) NR. The encoder 2 also outputs the pulses to an address generator 5 which detects a rotated position of the motor rotor based on the output pulses from the encoder 2. The address generator 5 is a counter for counting the number of pulses during each rotation of the motor shaft and generates a digital address signal q corresponding to the rotated position of the motor rotor based on the output from the encoder 2.

The digital address signal q produced from the address generator 5 is output as an address signal to a waveform memory (ROM) 10, which stores sine wave values, sin θ. As a result, the waveform memory 10 outputs sine wave values as the count from the address generator 5 rises. A detail of the address generator and the waveform memory 10 is disclosed in our previous U.S. patent application Ser. No. 08/539,635 filed Oct. 5, 1995, which is herein incorporated by reference.

The motor speed detector 3 outputs the motor speed NR to a torgue and speed controller (CPU) 6, which calculates and outputs a torque command signal iq according to a difference between the motor speed NR from the motor speed detector 3 and command inputs such as accelerator signal ACC or a brake input.

The torque and speed control 6 and waveform memory 10 are both output to a converter 12. The converter 12 comprises a multiplier 12a and D/A converter 12b. Multiplier 12a multiplies the amplitude signal iq supplied from the CPU 6 and the sine signal supplied from the waveform memory 10. D/A a converter 12b D/A converts the multiplied result, and outputs a U-phase voltage signal U12 and a W-phase voltage signal W12. Signals U12 and W12 are output to a current control circuit 17. It is noted that a V-phase signal is not output because U-phase+V-phase+W-phase=0, and if two phases are known, the third phase can be calculated therefrom.

The current control circuit 17 receives signals U12 and W12 from converter 12 and signals U20 and W20 from detectors 20U and 20W and outputs difference signals U17, V17 and W17. Signal U17 represents a difference between the motor current command voltage signal U17 from the converter 12 and a detection signal U20 obtained from, for example, the detector 20U. Similarly signal V17 represents a difference between signals V12 and V20, and signal W17 represents a difference between signals W12 and W20. Signals W12 and W20 are calculated in the current control circuit 17.

A pulse width modulation (PWM) control circuit 18 receives the signals U17, V17 and W17 from the current control circuit 17 and generates a pulse width modulation signal. A PWM inverter 19 coupled to the PWM control circuit 18 drives the motor 1 according to the output signal from the PWM controller 18.

Current detectors 20U and 20W are provided for detecting the U-phase and W-phase currents of the motor 1. The current detectors may be formed by current transformers which detect the load current flowing to the motor 1.

Figure 2A:
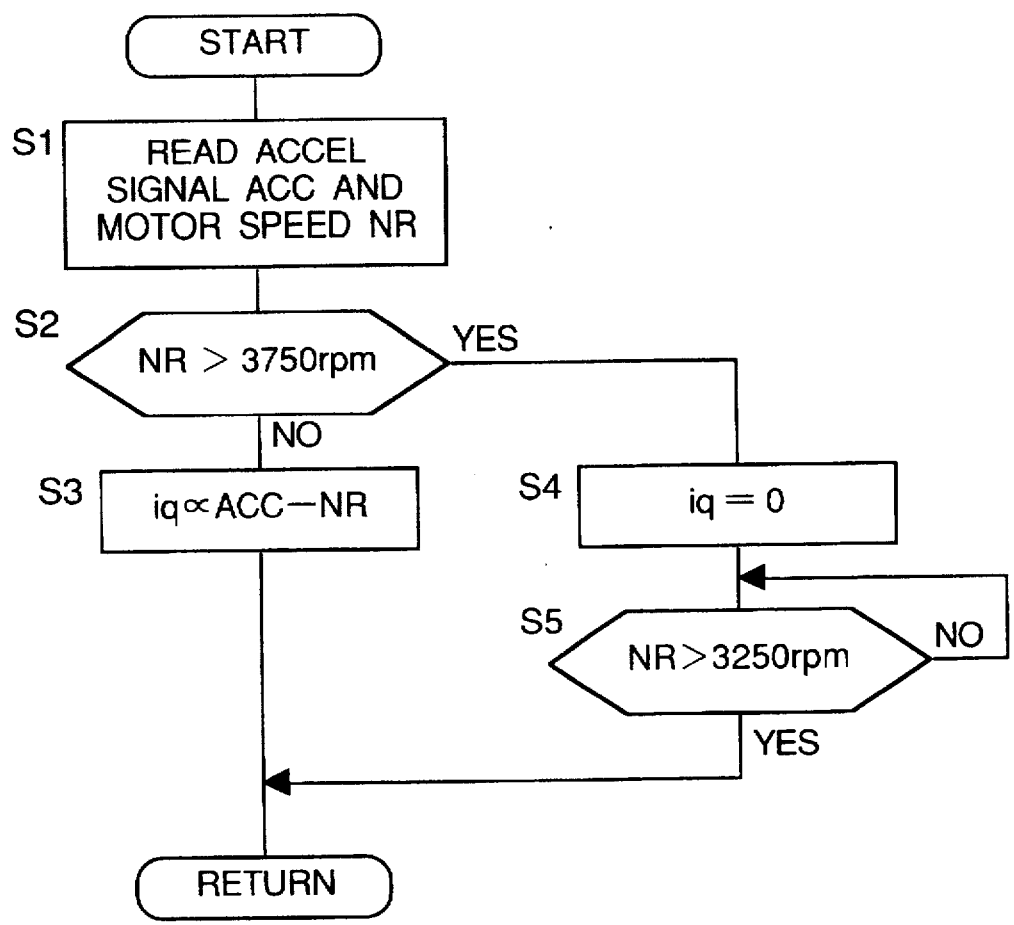
FIGS. 2A, 2B and 2C are flow charts of first, second and third protection systems, respectively, used for the apparatus of FIG. 1.

Referring to FIG. 2A, a flow chart of the first protection system effected in the speed control means 6 is shown. It is noted that the specified maximum motor speed in this embodiment is set to 5000 rpm. A control start speed (CSS) at which overspeed control starts is set to 3750 rpm for safety reasons, and a control end speed (CES) at which overspeed control stops (normal control resumes) is set to 3250 rpm. A limit speed (LS) is set to 4000 rpm. It is noted that other speeds can be selected.

In FIG. 2A, at step S1, accelerator signal ACC and motor speed NR indicative of the number of rotation of the motor) are read. At step S2, it is detected whether the motor speed NR is greater than the control start speed, e.g., 3750 rpm. If the motor speed NR is not greater than 3750 rpm, the program goes to step S3 at which the torque command signal iq is calculated in a normal way, i.e., according to a difference between the output signal NR from the motor speed detector 3 and command inputs such as the accelerator signal ACC or the brake input. Thus, at step S3, the motor 1 is driven under a normal driving mode. If the motor speed NR is greater than 3750 rpm, the program goes to step S4, so that the torque command signal iq is forcibly set equal to zero to set the motor 1 to a coaster mode in which the motor 1 coasts irrespective of the accelerator input command ACC, and the vehicle speed will be decreased. Then, at step S5, it is detected whether the motor speed NR is reduced to the control end speed 3250 rpm. After step S3 or S5 the program returns.

Referring to FIG. 3A, a graph of the motor characteristics is shown.

Line O-A-B-C shows the motor accelerating from point O in response to the acceleration command, accelerating through point A and point B, and stabilizing where the load is balanced with the acceleration command (point C).

Line O-D-E-F-G-H-I-F shows the operation under the first protection system. When the accelerator is pressed to the floor for maximum acceleration (the full-acceleration command), the motor accelerates from point O at the maximum rate of acceleration, and passes through points D–F.

Because the present embodiment applies torque command control, signal iq (which is in relation to the acceleration command) is normally output irrespective of the motor speed. As a result, the full current command is applied to supply the maximum current level to the motor through point F because the full-acceleration command continues to be output. When the motor speed exceeds the control start speed CSS, 3750 rpm (at point G in this example), however, the signal iq is set to zero. Thus, no drive current is applied to the motor, and therefore, the motor coasts. The motor speed therefore gradually declines from point H, and when the motor speed drops to the control end speed CES, 3250 rpm at point I, overspeed control stops and normal control resumes. Because the full-acceleration command is still being output at this time, the motor speed returns to point F and then point G, and overspeed control under the first protection system is again applied.

Figure 3B:
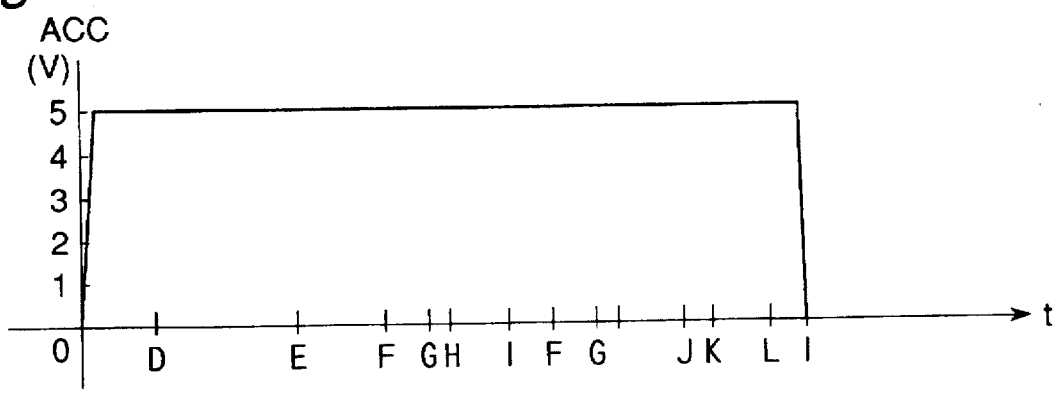
FIGS. 3B and 3C are graphs, respectively, showing accelerator input values and motor current control values of the first, second and third protection systems.
Figure 3C:
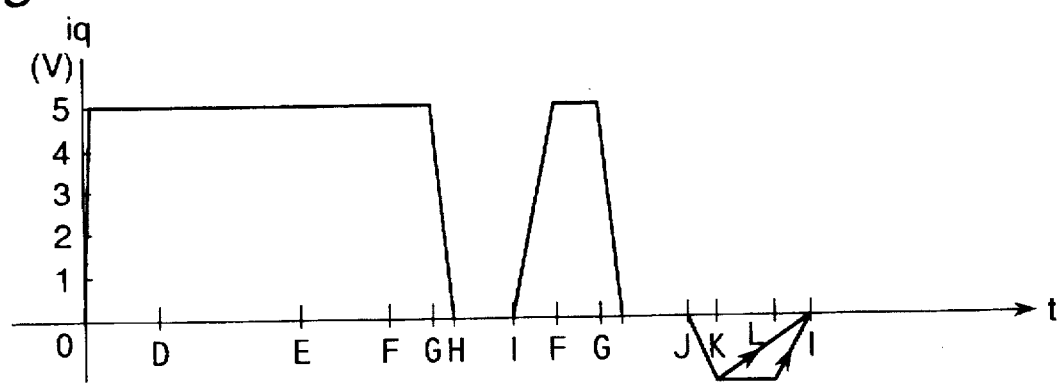

In FIG. 3B, it is shown that the full-acceleration input ACC is continuously applied from point O to point G (second occurrence) and further thereafter. In FIG. 3C, it is shown that signal iq is interrupted between points H and I under the coaster mode.

Figure 2B:
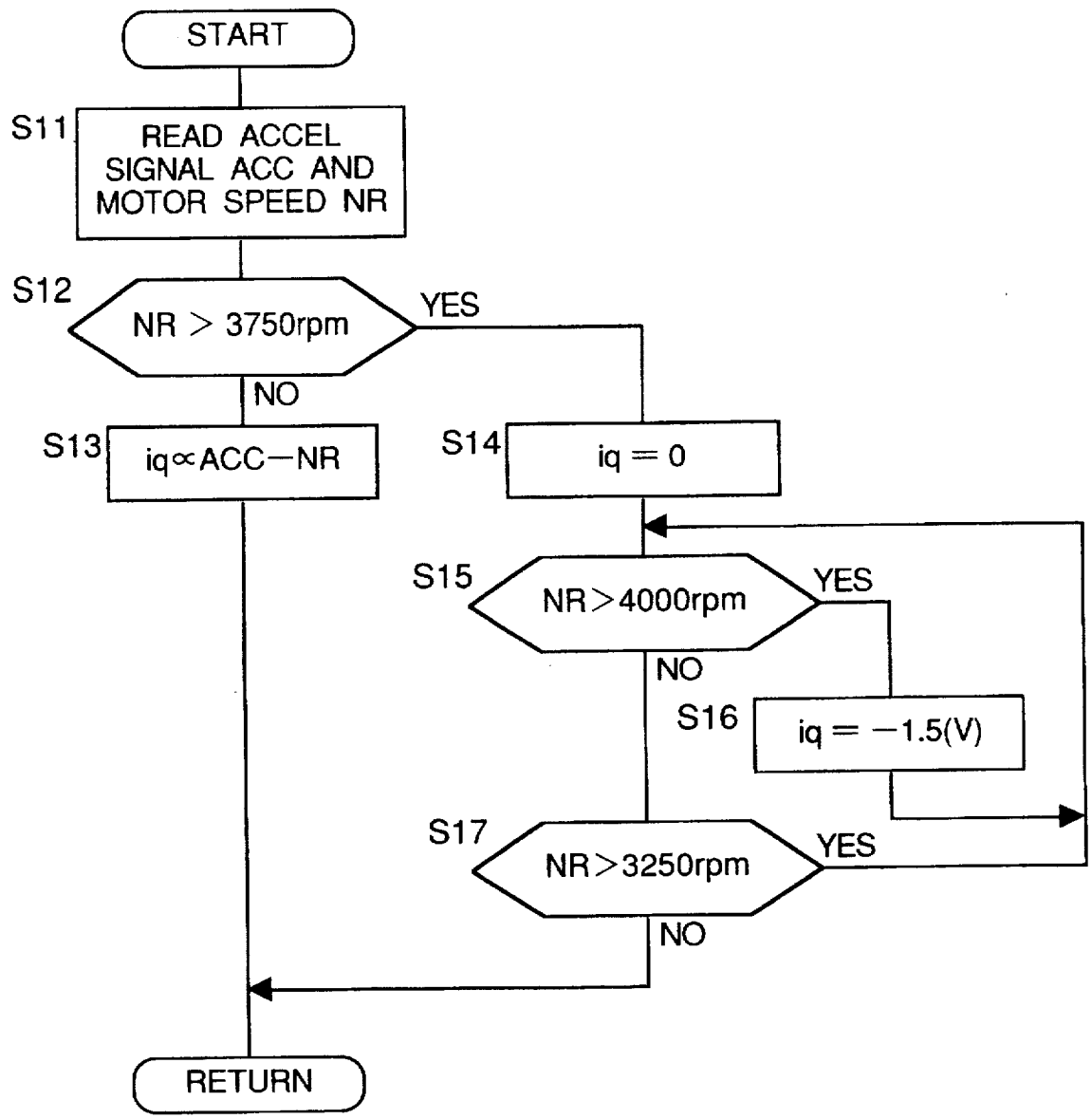

Referring to FIG. 2B, a flow chart of the second protection system effected in the speed control 6 is shown.

At step S11, accelerator signal ACC and motor speed NR indicative of the number of rotation are read. At step S12, it is detected whether the motor speed NR is greater than the control start speed, e.g., 3750 rpm. If the motor speed NR is not greater than 3750 rpm, the program goes to step S13, at which the torque command signal iq is calculated in a normal way (i.e., normal driving mode), in the same way as in step S3. If the motor speed NR is greater than 3750 rpm, the program goes to step S14 at which the torque command signal iq is forcibly set equal to zero (coaster mode), so that the motor coasts, irrespective of the accelerator input command ACC, and the vehicle speed will be decreased.

At step S15, it is detected whether the motor speed NR is greater than the limit speed LS, 4000 rpm. If the motor speed NR is greater than the limit speed 4000 rpm, the program goes to step S16, at which the signal iq is forcibly made equal to −1.5 V so as to change the mode of the motor 1 from the coaster mode to a constant regeneration mode. By setting the motor 1 to the constant regeneration mode, a regenerative braking effect is produced. Thus, the motor speed can be decreased more quickly than the coaster mode. Signal iq is set to a negative value at step S16 so that it can serve as a regeneration torque command signal, and is obtained by the equation $$iq = Ta \times G/(LS-CES) \quad (1)$$

where G=LS−CES, and Ta is an amount of regeneration such as Ta=−1.5 Kgm. Thus, iq=−1.5 Kgm is obtained for the second protection system.

When the motor speed NR is not greater than 4000 rpm, the program goes to step S17, where it is detected whether or not the motor speed NR is reduced to the control end speed 3250 rpm. After step S17 or 813 the program returns.

Referring to FIG. 3A, line O-D-E-F-G-J-K-L-M-I-F shows the operation under the second protection system. Up to the point G, the operation is the same as the first protection system. At step S14, the motor first enters the coaster mode to cut the driving power of the motor 1. Thereafter, if an external inertial force is high or the acceleration load is high, e.g., the vehicle is descending a steep slope during forward travel, the motor does not decelerate under the coaster mode, but accelerates to point J. If the motor speed continues to accelerate to 4000 rpm or greater (point K), the motor current command is set to regenerate, and motor speed decelerates from point L to point M during which a constant regeneration is effected.

Figure 2C:
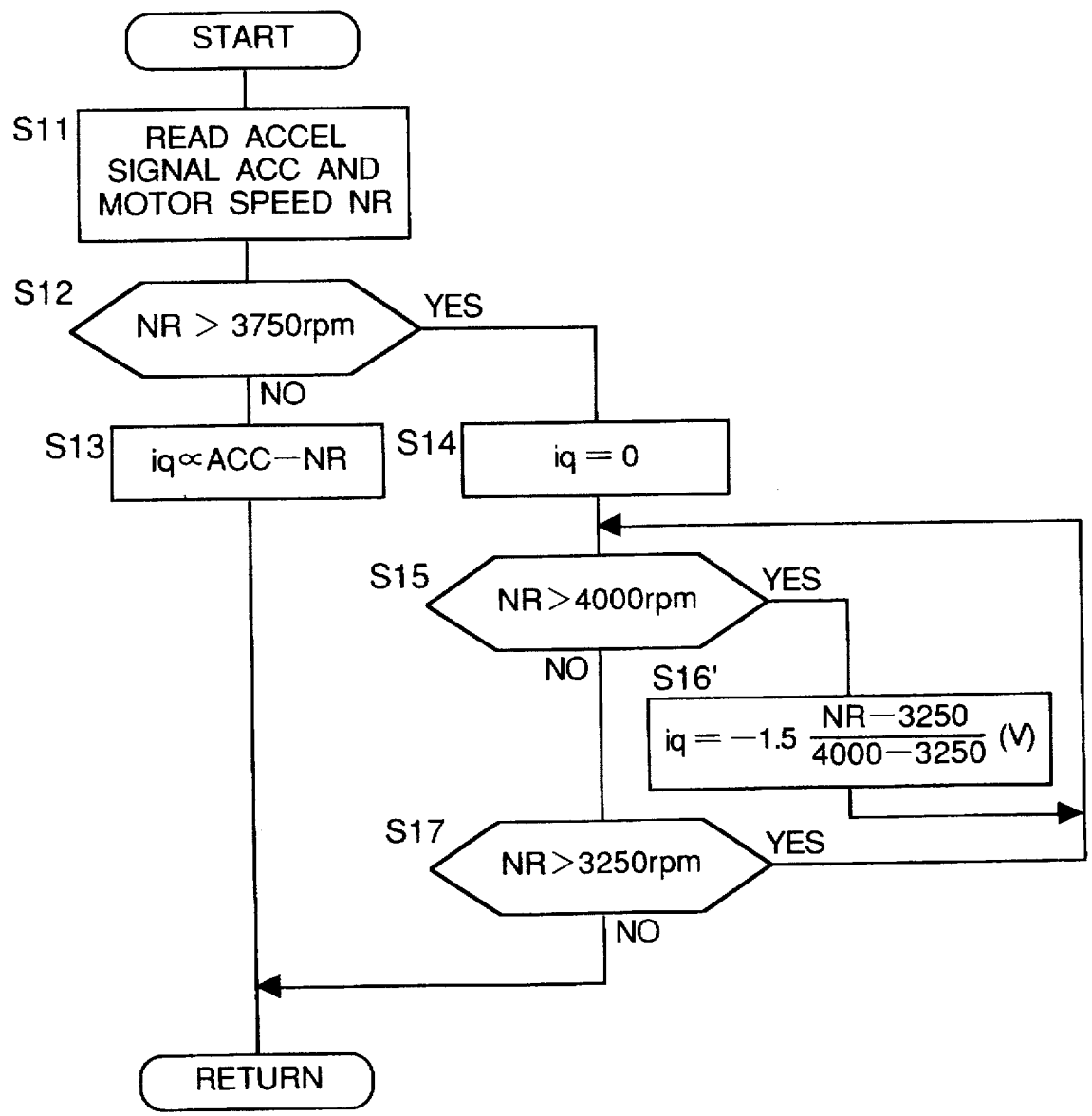

Referring to FIG. 2C, a flow chart of the third protection system effected in the speed control 6 is shown. When compared with the flow chart of FIG. 2B, the flow chart of FIG. 2C differs that step S16 is replace with step S16'. All other steps are the same.

At step S16', a controlled regeneration mode is set so that the regeneration is effected not by a constant signal iq but by a signal iq that varies relative to the motor speed as given by the following equation:

$$iq = Ta \times G/(LS-CES) \quad (1)$$

where G=NR−CES.

Thus, iq=−1.5 (NR−3250)/(4000−3250) is obtained.

Thus, between points L and I in FIG. 3A, under the controlled regeneration mode, the motor speed declines. The normal driving mode is once again resumed when the motor speed reaches point I.

In FIG. 3C, it is shown that signal iq falls below zero between points J and I under the constant and controlled regeneration modes.

As described above, motor control is applied according to the accelerator input command until the motor speed exceeds the control start speed CSS, and the driver's sense of control is therefore not affected. Accidents resulting from rapid deceleration of the vehicle during overspeed control are also avoided, and damage to the motor can be prevented.

Figure 4:
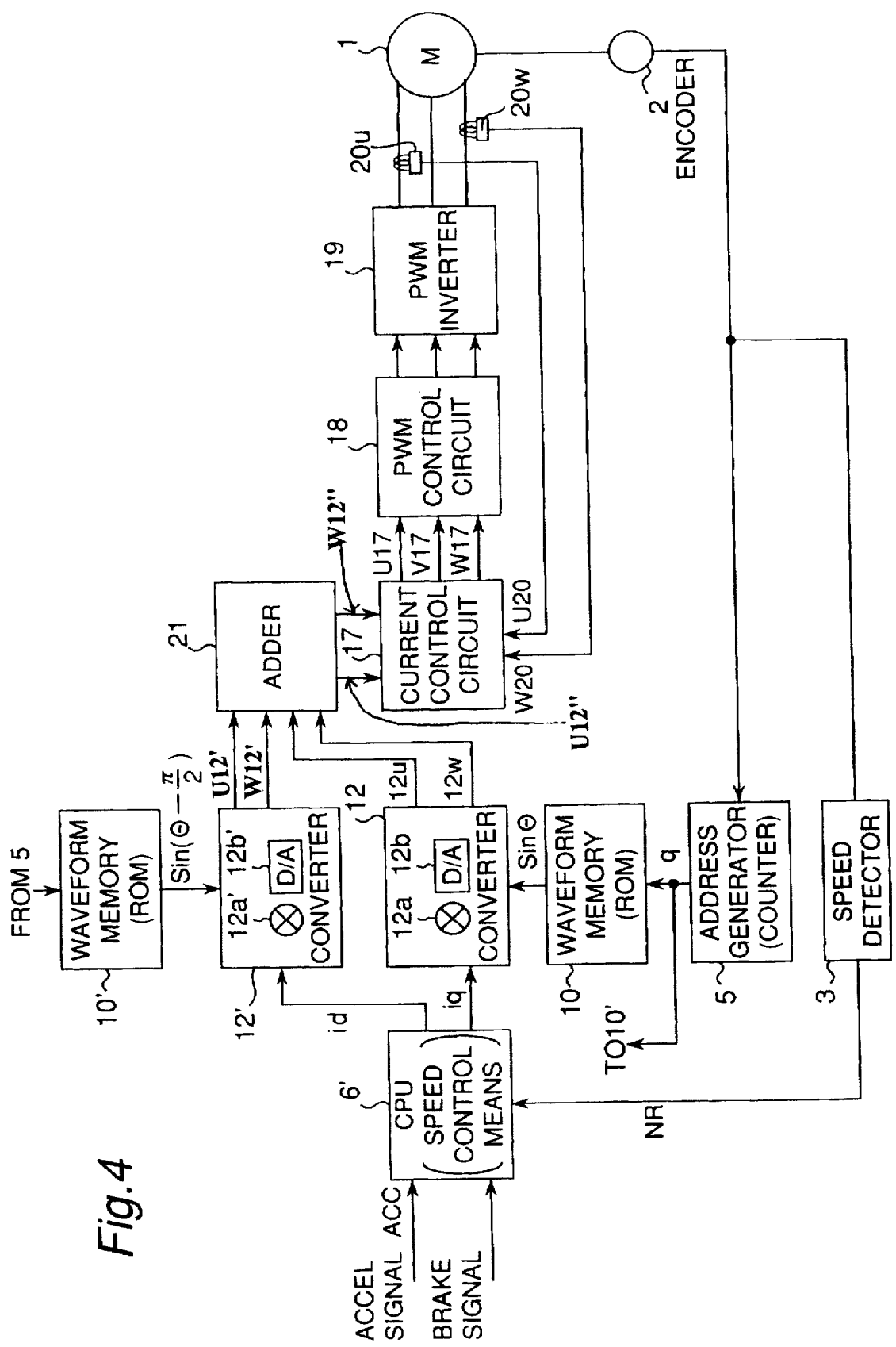
FIG. 4 is a block diagram of a motor control apparatus according to a second preferred embodiment of the present invention.

Referring to FIG. 4 a motor control apparatus according to the second embodiment of the present invention is shown. It is noted that the motor control apparatus of FIG. 4 is applied with any one of a fourth, fifth and sixth protection systems. Also, it is noted that this embodiment applies a field-weakening control to an electric car driven by a synchronous motor.

When compared with the motor control apparatus of FIG. 1, the motor control apparatus of FIG. 4 further has another waveform memory 10', another convertor 12' and an adder 21. Also, in place of speed control 6, a speed control 6' is provided so as to enable the fourth, fifth or sixth protection system.

Digital address signal q produced from the address generator 5 is also output as an address signal to waveform memory (ROM) 10', which stores sine wave values, sin (θ−π/2). As a result, the waveform memory 10' outputs sine wave values, which lags π/2 from the sine wave values from waveform memory 10, as the count from the address generator 5 rises.

The torque and speed control (CPU) 6' also outputs weakening current signal id, and waveform memory 10' outputs sin e sin (θ−π/2) which are both applied to converter 12'. Converter 12' comprises a multiplier 12a' and D/A converter 12b'. Multiplier 12a' multiplies the amplitude signal id supplied from CPU speed control means 6' and the sine signal sin (θ−π/2) supplied from the waveform memory 10'. D/A converter 12b' D/A converts the multiplied result, and outputs U-phase voltage signal U12' and W-phase voltage signal W12'. Signals U12' and W12' are output to an adder 21. Adder 21 also receives the U-phase voltage signal U12 and W-phase voltage signal W12 from converter 12 and adds the signals U12 and U12' and produces a sum U12" and adds the signals W12 and W12' to produce a sum W12". The adder 21 supplies signals U12" and W12" to the current control circuit 17.

In other words, according to the second embodiment, a field-weakening current control is applied, and a d-axis waveform memory 10', d-axis converter 12', and adder 21 are further provided. The adder 21 separately adds and integrates the U-phase and W-phase of the q-axis converter 12 and the d-axis converter 12'. A detail of the field-weakening current control is disclosed in "Flux-Weakening Regime Operation of an Interior Permanent-Magnet Synchronous Motor Drive" by Thomas M. Jahns of IEEE Transactions on Industry applications, Vol. IA-23, No. 4, July/August 1987, European Patent Publication No. 0 503 879 A2; and U.S. Pat. No. 5,504,404, which issued on Apr. 2, 1996 (assigned to the same assignee as the present application), which are herein incorporated by reference.

Figure 5A:
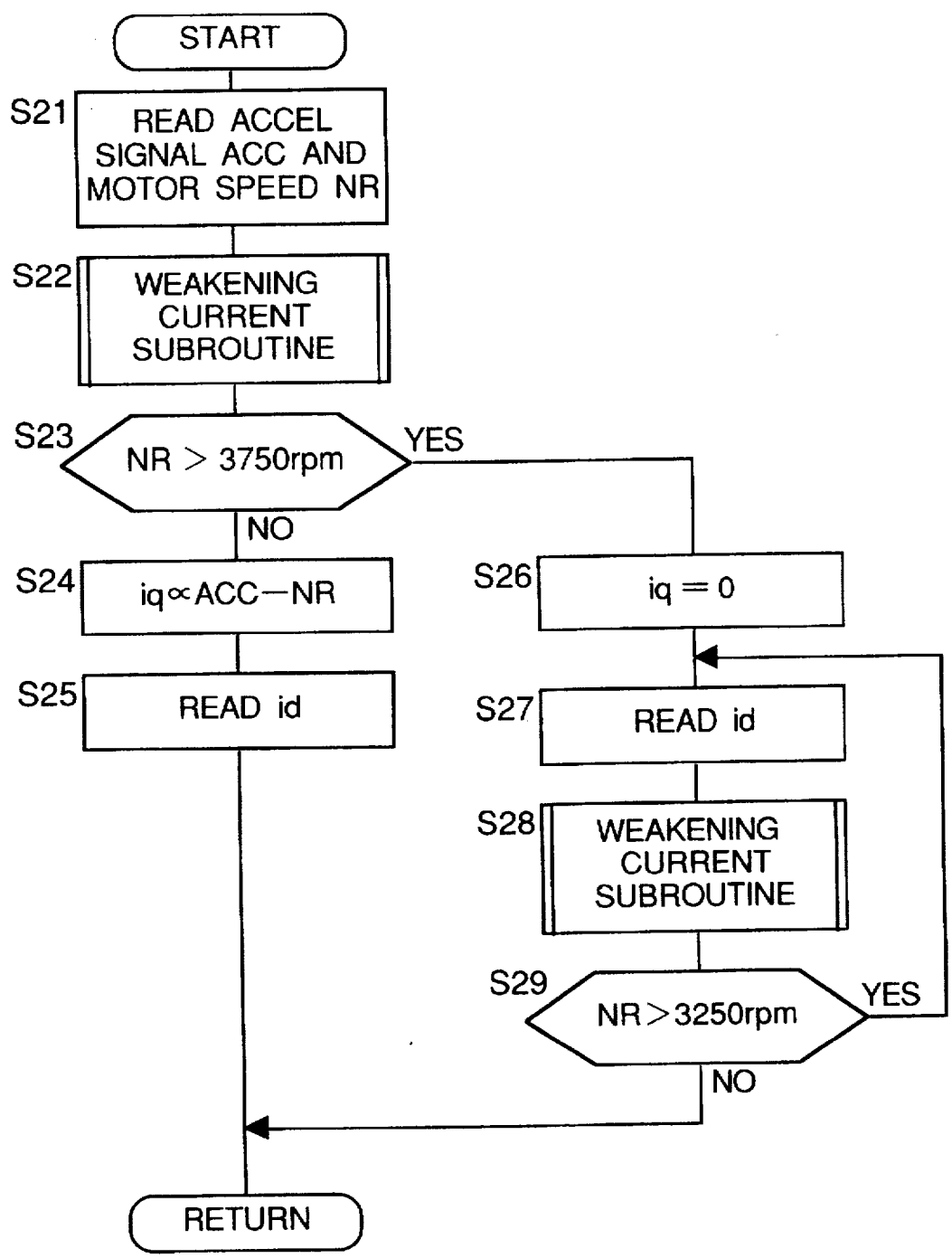
FIGS. 5A, 5C and 5D are flow charts of fourth, fifth and sixth protection systems, respectively, used for the apparatus of FIG. 4.
Figure 6A:
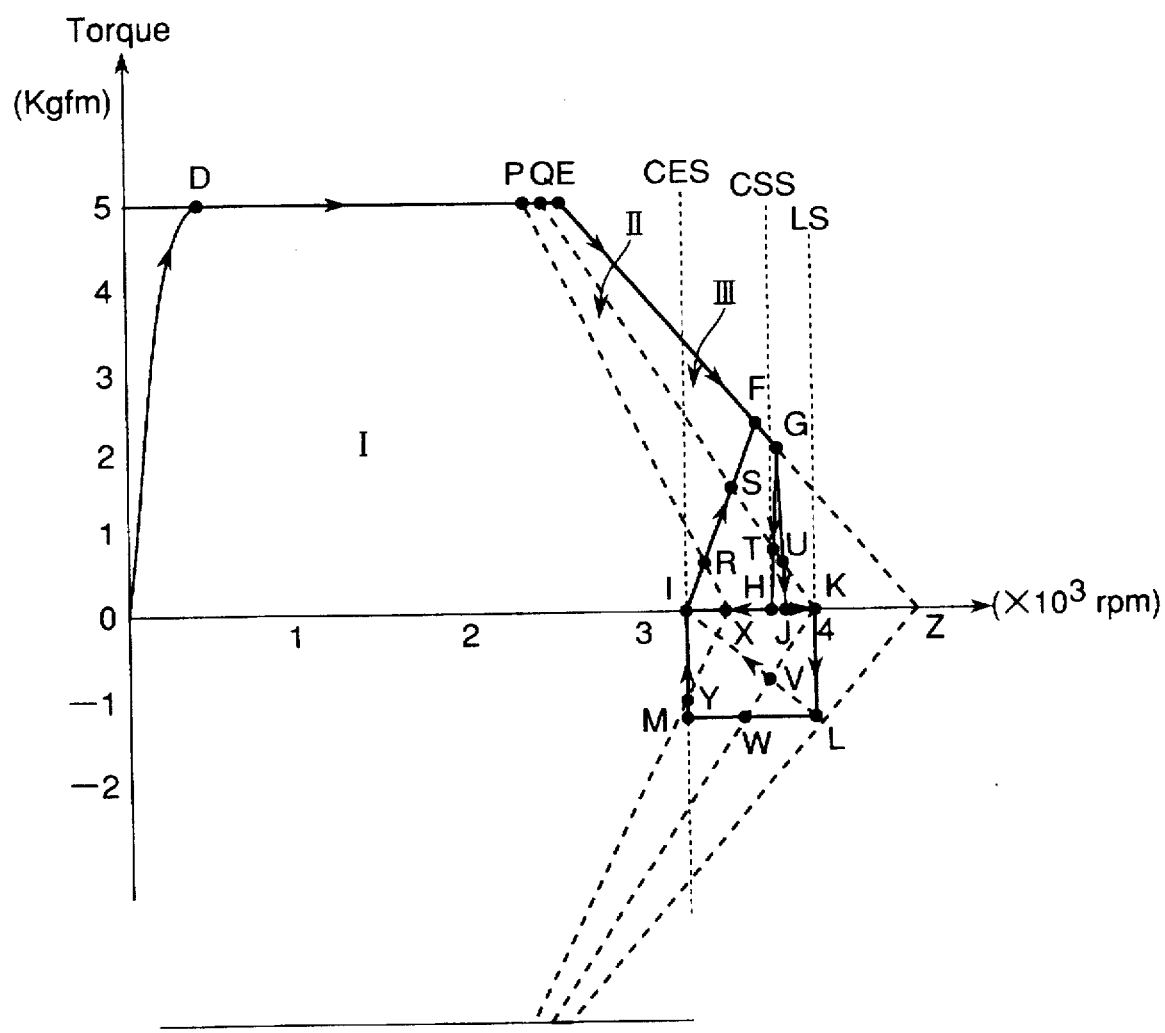
FIG. 6A is a graph of motor characteristics controlled by the fourth, fifth and sixth protection systems.

Referring to FIG. 5A, a flow chart of the fourth protection system effected in the speed control 6' is shown. It is noted that the specified maximum motor speed in this embodiment is set to 5000 rpm, the control start speed (CSS) is set to 3750 rpm, the control end speed (CES) is set to 3250 rpm, and the limit speed (LS) is set to 4000 rpm. It is noted that other speeds can be selected. In the second embodiment, the motor speed and torque characteristics is divided into three regions I, II and III. Region I is an area where normal control is applied, i.e., field-weakening control is not applied; region II is an area where field-weakening control is applied a low level; and region III is an area where field-weakening control is applied a high level. As shown in FIG. 6A, when a point (motor speed, torque) in the graph is expressed by (x rpm, y kgfm), regions I and II are bordered by a line extending between P(2300, 5) and X(3500, 0); regions II and III are bordered by a line extending between Q(2400, 5) and K(4000, 0); and region III is limited by a line extending between E(2500, 5) and Z(5000, 0). Regions symmetrical about the x-axis are formed in the negative side.

In FIG. 5A, at step S21, accelerator signal ACC and motor speed NR indicative of the number of rotation are read. At step S22, a weakening current subroutine is carried out.

Figure 5B:
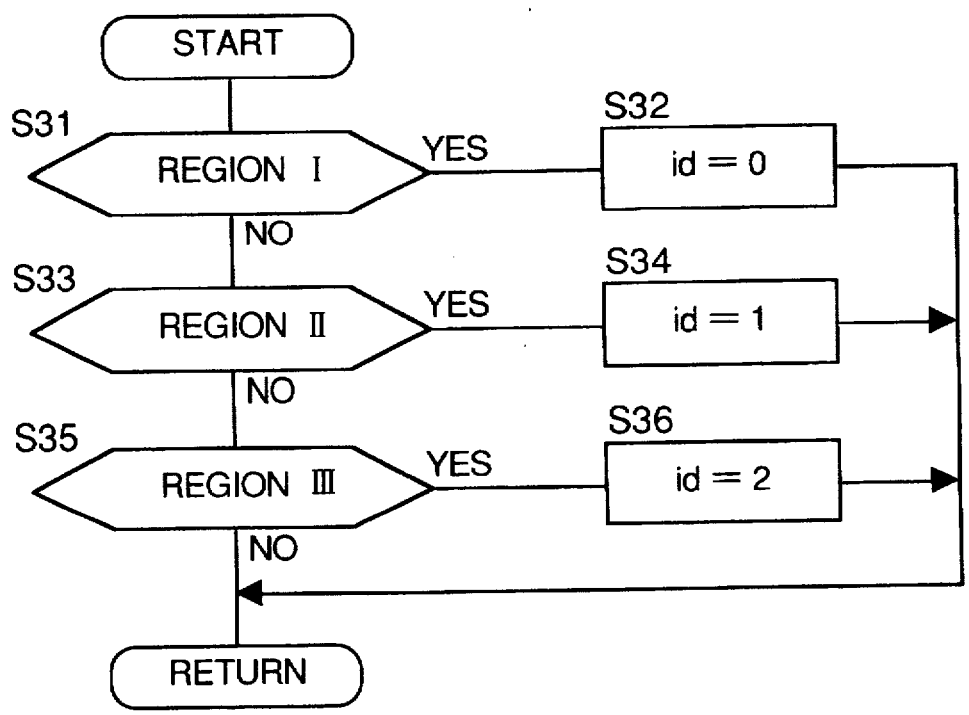
FIG. 5B is a flow chart of a weakening current subroutine used in the flow charts of FIGS. 5A, 5C and 5D.

Referring to FIG. 5B, the weakening current subroutine is shown which starts from step S31. At step S31 it is detected whether the present point (motor speed, torque) plotted on a graph is in region I. If the present point is in region I, weakening current signal id is set to zero (0) at step S32. At step S33 it is detected whether the present point plotted on a graph is in region II. If the present point is in region II, weakening current signal id is set to one (1) at step S34. At step S35 it is detected whether the present point plotted on a graph is in region III. If the present point is in region III, weakening current signal id is set to two (2) at step S36.

Returning back to FIG. 5A, at step S23, it is detected whether the motor speed NR is greater than the control start speed, e.g., 3750 rpm. If the motor speed NR is not greater than 3750 rpm, the program goes to step S24, at which the torque command signal iq is calculated in a normal way. Then, at step S25, the weakening current signal id set in the subroutine S22 (FIG. 5B) is read and produced. Thus, at steps S24 and S25, the motor 1 is driven under a normal driving mode.

If the motor speed NR is greater than 3750 rpm, the program goes to step S26 at which the torque command signal iq is forcibly made equal to zero to set the motor 1 to a coaster mode in which the motor 1 coasts irrespective of the accelerator input command ACC, and the vehicle speed will be decreased. Then, at step S27, when this step is entered for the first time, the weakening current signal id as set in the subroutine S22 is read and produced. At step S28, weakening current subroutine is again carried out to renew the weakening current signal id. Then, at step S29, it is detected whether the motor speed NR is reduced to the control end speed 3250 rpm. If the motor speed NR is still greater than the control end speed 3250 rpm, the program returns to step S27 to read and produce the weakening current signal id as set in subroutine S28.

Figure 5C:
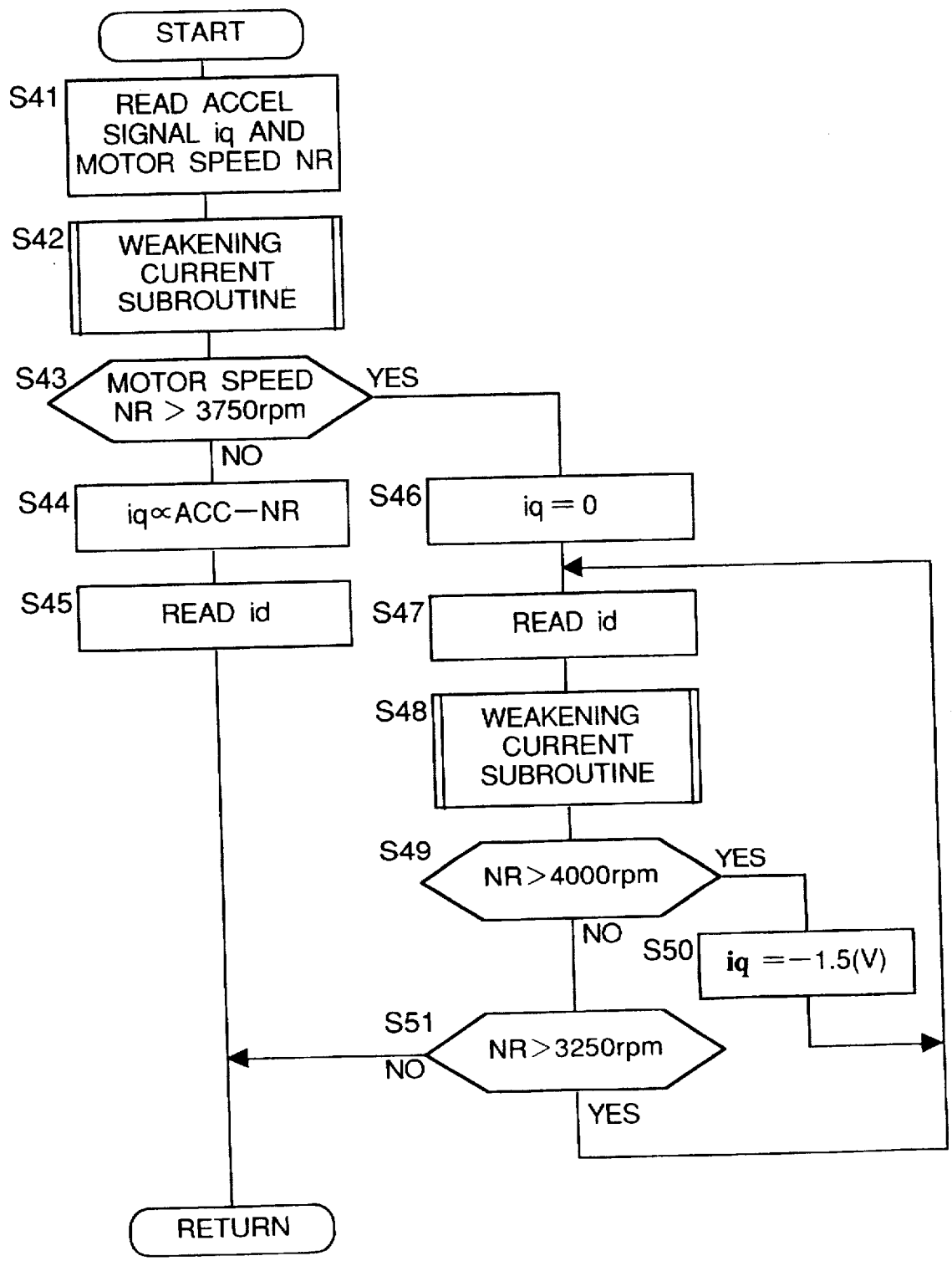

Referring to FIG. 5C, a flow chart of the fifth protection system effected in the speed control 6' is shown.

At step S41, accelerator signal ACC and motor speed NR indicative of the number of rotation are read. At step S42, a weakening current subroutine is carried out. At step S43, it is detected whether the motor speed NR is greater than the control start speed, e.g., 3750 rpm. If the motor speed NR is not greater than 3750 rpm, the program goes to step S44, at which the torque command signal iq is calculated in a normal way. Then, at step S45, the weakening current signal id set in the subroutine S42 is read and produced. Thus, at steps S44 and S45, the motor 1 is driven under a normal driving mode.

If the motor speed NR is greater than 3750 rpm, the program goes to step S46 at which the torque command signal iq is forcibly made equal to zero (coaster mode), so that the motor coasts irrespective of the accelerator input command ACC, and the vehicle speed will be decreased. Then, at step S47, the weakening current signal id as set in the subroutine S42 is read and produced. As step S48, the weakening current subroutine is again carried out.

At step S49, it is detected whether the motor speed NR is greater than the limit speed LS, 4000 rpm. If the motor speed NR is greater than the limit speed 4000 rpm, the program goes to step S50 at which the signal iq is forcibly made equal to −1.5 V so as to change the mode of the motor 1 from the coaster mode to the constant regeneration mode. Thereafter, the program returns to step S47.

When the motor speed NR is not greater than 4000 rpm, the program goes to step S51, where it is detected whether or not the motor speed NR is reduced to the control end speed 3250 rpm.

Figure 5D:
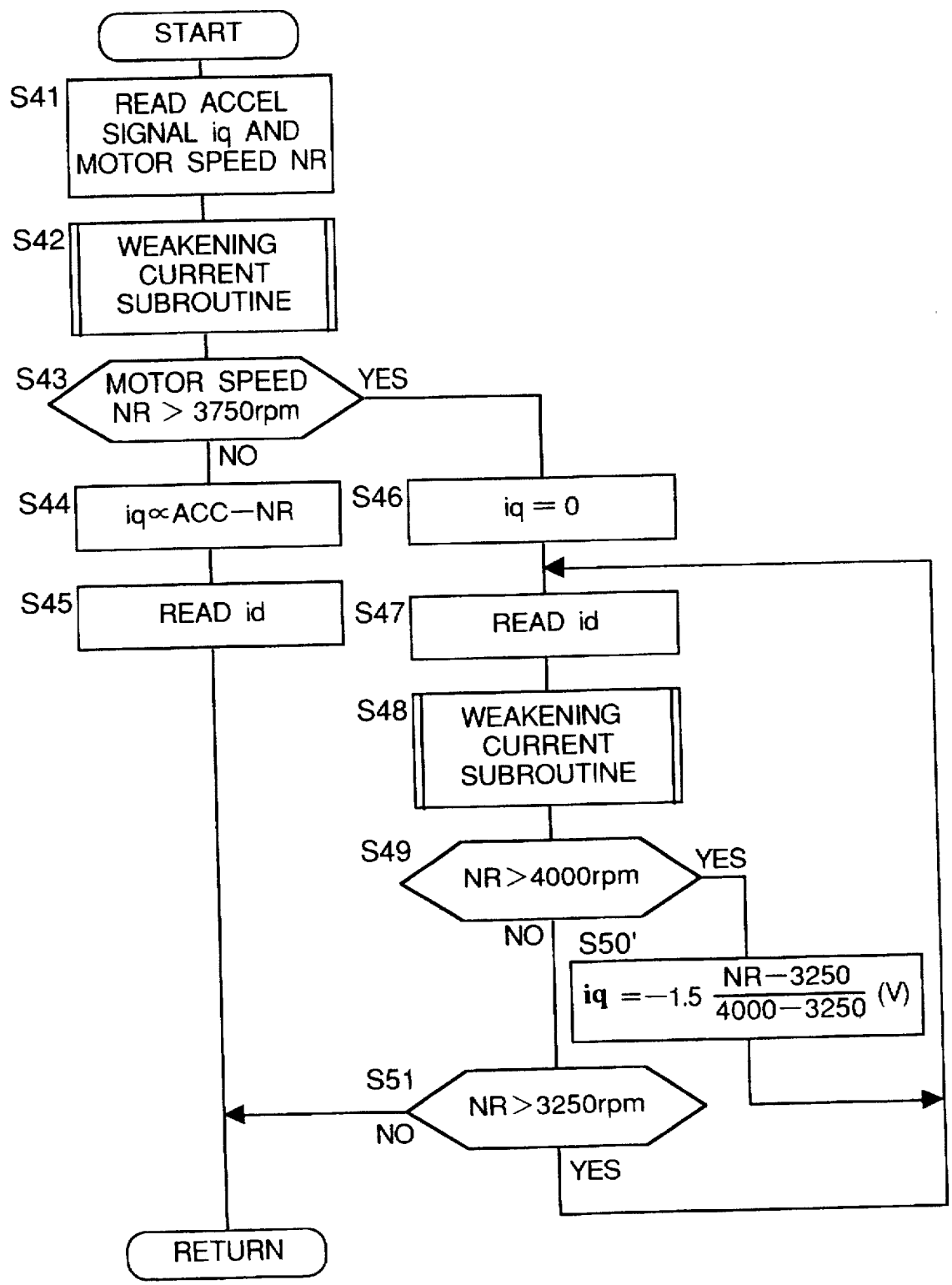

Referring to FIG. 5D, a flow chart of the sixth protection system effected in the speed control 6' is shown. When compared with the flow chart of FIG. 5C, the flow chart of FIG. 5D differs that step S50 is replace with step S50'. All other steps are the same.

At step S50', a controlled regeneration mode is set so that the regeneration is effected not by a constant signal iq but by a signal iq that varies relative to the motor speed as given by the following equation:

$$iq = Ta \times G/(LS - CES) \tag{1}$$

where G=NR−CES.

Thus, iq=−1.5 (NR-3250)/(4000-3250) is obtained.

Referring to FIG. 6A, a graph of the motor characteristics is shown. In FIG. 6A, line O-D-E-F-G-H-I-F shows the operation under the fourth protection system; line O-D-E-F-G-J-K-L-M-I-F shows the operation under the fifth protection system; and line O-D-E-F-G-J-K-L-I-F shows the operation under the sixth protection system.

Figure 6B:
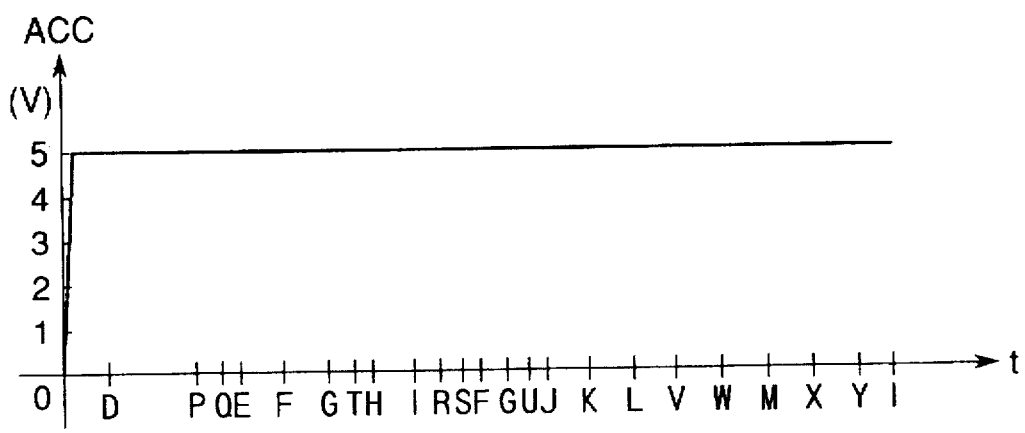
FIGS. 6B, 6C and 6D are graphs showing accelerator input values and motor current control values of the fourth, fifth and sixth protection systems.
Figure 6C:
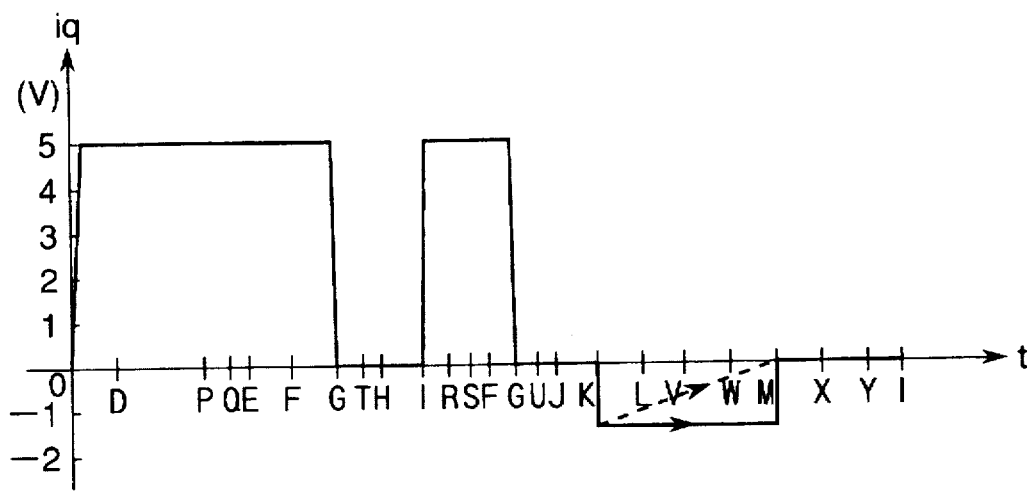
Figure 6D:
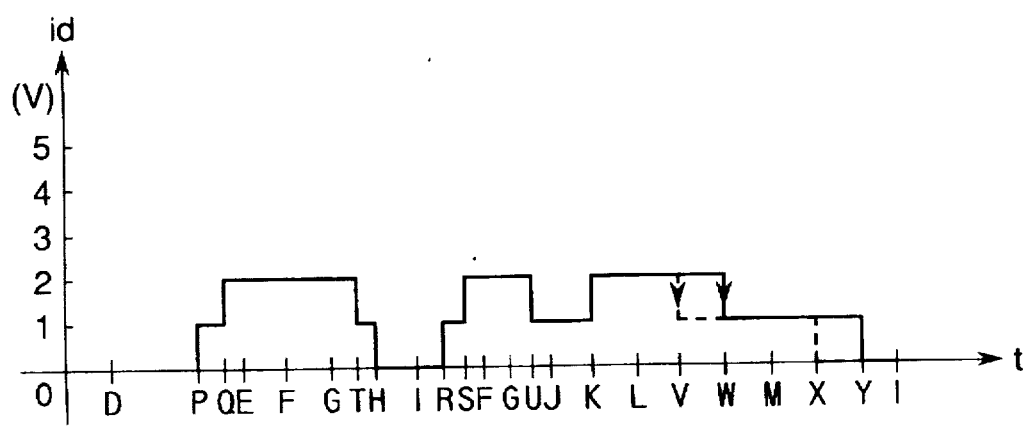

FIG. 6B shows a full-acceleration input. FIG. 6C shows the torque command signal iq which is in turn relational to q-axis current commands 12U and 12W, and FIG. 6D shows weakening current signal id which is in turn relational to d-axis current commands 12U' and 12W'. Because the present embodiment applies torque command control, current commands 12U and 12W proportional to the acceleration command are normally output irrespective of the motor speed. In addition, d-axis current commands 12U' and 12W' are output for field weakening according to the control area.

Figure 7:
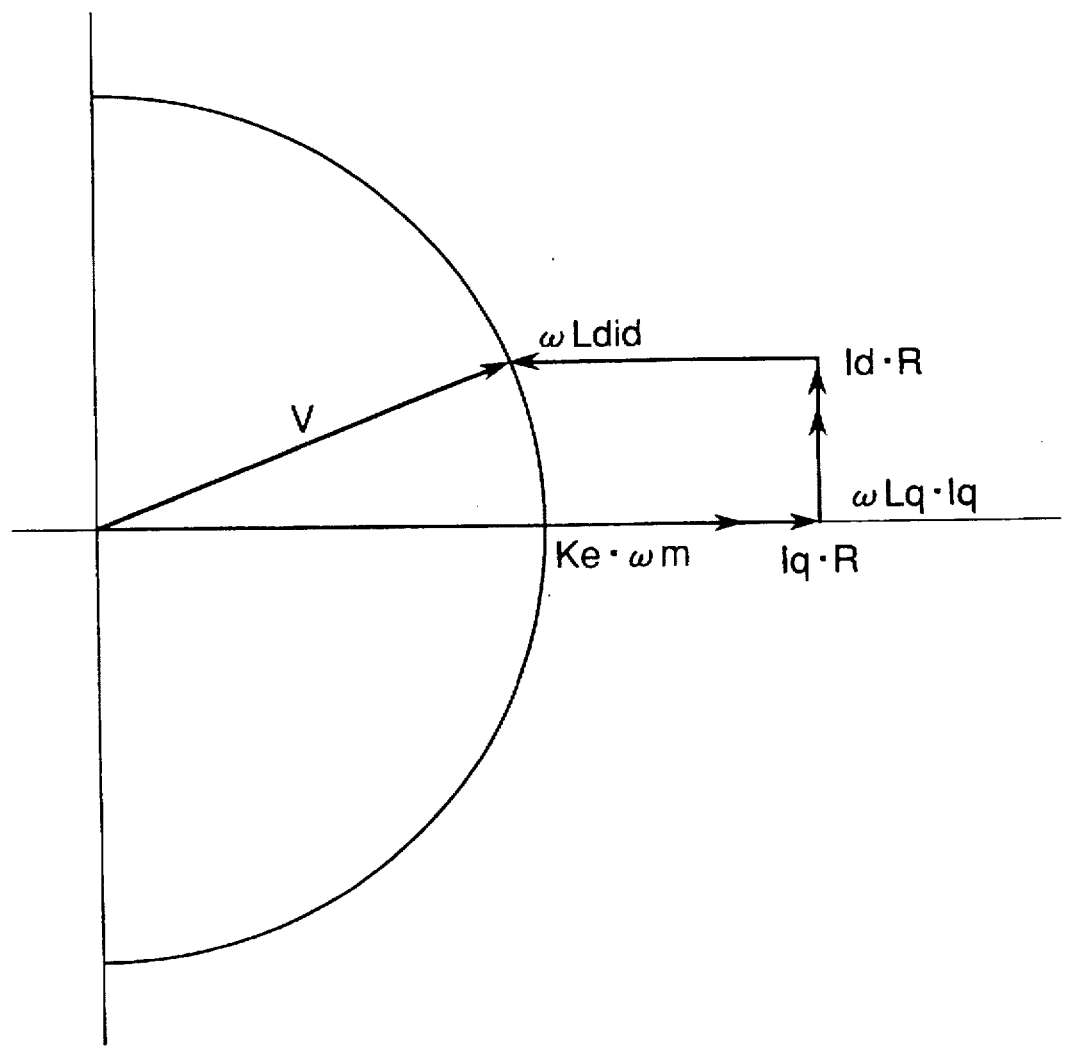
FIG. 7 is a voltage vector diagram used to describe a field-weakening control.

FIG. 7 is a vector diagram used to describe the field weakening, and is a vector diagram of the voltages applied to the motor when the motor is operating according to torque current iq and weakening current id. In FIG. 7, Ke is the induction voltage constant of the motor; Lq, the q-axis inductance of the motor; Ld, the d-axis inductance of the motor; R, the motor resistance; $\omega_m$, the present speed; and V, the voltage applied to the motor.

Also in FIG. 7, Ke Σ $\omega_m$ is the induction voltage generated when the motor is turning at $\omega_m$; iq Σ R is the voltage generated when torque current iq is supplied to the motor resistance; $\omega$Lq Σ iq is the voltage generated when the motor is turning at $\omega_m$ where $\omega$=P×$\omega_m$ and P is a maximal value; id Σ R is the voltage generated when torque current iq is supplied to the motor resistance; $\omega$Ld Σ id is the voltage generated when the motor is turning at $\omega_m$; and the d-axis current is advanced 90 degrees from the q-axis current.

Ke Σ $\omega_m$+Lq Σ iq is within the voltage limit circle in region I (FIG. 6A), but is outside the voltage limit circle in region II. Vector V can therefore be returned to within the voltage limit circle by supplying the d-axis current. This is the principle of field-weakening control. Note that the d-axis current level is different for field-weakening control in region III.

The q-axis current command values for overspeed control are the same as in the first embodiment above. The d-axis current command values are determined according to the region in FIG. 6A, and the operating point of the motor is therefore evaluated to determine the command value.

As described above, motor control is applied according to the accelerator input command until the motor speed exceeds the control start speed CSS, and the driver's sense of control is not affected. An appropriate d-axis current is also supplied in the field weakening region, thereby avoiding accidents resulting from rapid deceleration of the vehicle and over-regeneration by the induction voltage generated during overspeed control, and preventing damage to the motor.

As will be known from the above descriptions of the invention, torque is generated in an electric car according to the accelerator input command until the motor speed exceeds the control start speed CSS, and the driver's sense of control is therefore not impaired. When the motor speed exceeds this limit CSS, braking is applied only when necessary, thereby maintaining vehicle safety and preventing potential collisions resulting from sudden deceleration (braking), and preventing damage to the motor.

In addition, accidents resulting from rapid deceleration, over-regeneration due to the induction voltage generated during overspeed control, and damage to the motor can be avoided because an appropriate d-axis current is supplied during field-weakening control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor control apparatus for controlling a rotation speed of a motor for use in an electric car, comprising:

rotation speed detection means for detecting a rotation speed of said motor;

power supplying means for supplying power to said motor; and speed control means for controlling said rotation speed of said motor by adjusting said power supplying means in response to an input command, said speed control means forcibly making said power supplying means stop supplying power to said motor when said rotation speed of said motor exceeds a predetermined control start speed, whereby said motor coasts irrespective of said input command when said motor speed exceeds said predetermined control start speed, said speed control means permitting said power supplying means to resume supplying power to said motor when said rotation speed of said motor reaches a predetermined control end speed which is lower than said predetermined control start speed, said speed control means comprising a closed-loop control circuit that controls said rotation speed of said motor.

2. A motor control apparatus as claimed in claim 1, further comprising:

weakening current supplying means for supplying a weakening current to said motor, wherein said speed control means sets said weakening current to a predetermined level when said rotation speed exceeds a predetermined speed.

3. A motor control apparatus for controlling a rotation speed of a motor for use in an electric car, comprising:

rotation speed detection means for detecting a rotation speed of said motor;

power supplying means for supplying power to said motor; and speed control means for controlling said rotation speed of said motor by adjusting said power supplying means in response to an input command, said speed control means forcibly making said power supplying means regenerate power from said motor when said rotation speed of said motor exceeds a predetermined limit speed, whereby said motor regenerates power irrespective of said input command when said motor speed exceeds said limit speed, said speed control means permitting said power supplying means to resume supplying power to said motor when said rotation speed of said motor reaches a predetermined control end speed that is lower than said predetermined limit speed, said speed control means comprising a closed-loop control circuit that controls said rotation speed of said motor.

4. A motor control apparatus as claimed in claim 3, further comprising:

weakening current supplying means for supplying a weakening current to said motor, wherein said speed control means sets said the weakening current to a predetermined level when said rotation speed exceeds a predetermined speed.

5. A motor control method for controlling a rotation speed of a motor for use in an electric car, comprising:

detecting a rotation speed of the motor;

supplying power, via a power supply, to the motor;

controlling the rotation speed of the motor by adjusting the power supply to the motor in response to an input command, the speed of the motor being controlled by providing a closed-loop control circuit that controls the rotation steed of the motor;

forcibly stopping the power supply from supplying power to the motor when the rotation speed of the motor exceeds a predetermined control start speed, whereby the motor coasts in response to an input command when the motor speed exceeds the control start speed; and re-enabling the power supply to supply power to the motor when the rotation speed of the motor reaches a predetermined control end speed that is lower than the predetermined control start speed.

6. A motor control method as claimed in claim 5, further comprising the steps of:

supplying a weakening current to the motor; and setting the weakening current to a predetermined level when the rotation speed exceeds a predetermined speed.

7. A motor control method for controlling a rotation speed of a motor for use in an electric car, comprising:

detecting a rotation speed of the motor;

supplying power, via a power supply, to the motor;

controlling the rotation speed of the motor by adjusting the power supply to the motor in response to an input command, the rotation speed of the motor being controlled by providing a closed-loop control circuit that controls the rotation speed of the motor;

forcibly regenerating power from the motor when the rotation speed of the motor exceeds a predetermined limit speed, whereby the motor regenerates power irrespective of the input command when the motor speed exceeds the predetermined limit speed; and re-enabling the power supply to supply power to the motor when the rotation speed of the motor reaches a predetermined control end speed that is lower than the predetermined limit speed.

8. A motor control method as claimed in claim 7, further comprising the steps of:

supplying a weakening current to the motor; and setting the weakening current to a predetermined level when the rotation speed exceeds a predetermined speed.

9. A method for controlling a rotational speed of a motor, comprising the steps of:

supplying power to the motor to effect a rotation of the motor;

detecting and controlling a rotational speed of the motor by providing a closed-loop control circuit that controls the rotation speed of the motor;

setting an operation of the motor to a coast mode when the rotational speed of the motor is detected to reach a predetermined control start speed;

setting the operation of the motor to a constant regeneration mode when the rotational speed of the motor is detected to increase to a predetermined limit speed; and resuming the supplying of power to the motor when the rotational speed of the motor is detected to fall to a predetermined control end speed.

10. The method of claim 9, wherein the supplying step comprises supplying electrical power to the motor.

11. The method of claim 10, wherein the method for controlling a rotational speed of a motor is used with an electric vehicle.

12. The method of claim 9, wherein the step of setting the operation of the motor to a coast mode comprises the step of supplying a weakening current to the motor to a predetermined level when the rotational speed of the motor reaches the predetermined control start speed.

13. The method of claim 9, wherein the step of setting the operation of the motor to a constant regeneration mode occurs whenever the step of setting the operation of the motor to a coast mode fails to reduce the rotational speed of the motor.

14. The method of claim 9, wherein the predetermined control start speed is less than the predetermined limit speed.

* * * * *